US008166940B2

(12) United States Patent
Grass et al.

(10) Patent No.: US 8,166,940 B2
(45) Date of Patent: May 1, 2012

(54) INTERNAL COMBUSTION ENGINE WITH A CAMSHAFT BEARING DEVICE

(75) Inventors: Uwe Grass, Stuttgart (DE); Stefan Ruppel, Heidelberg Emmertsgrund (DE); Falk Schneider, Korntal-Munchingen (DE); Markus Walch, Bretten (DE)

(73) Assignee: Mahle International GmbH (DE)

( * ) Notice: Subject to any disclaimer, the term of this patent is extended or adjusted under 35 U.S.C. 154(b) by 653 days.

(21) Appl. No.: 12/345,210

(22) Filed: Dec. 29, 2008

(65) Prior Publication Data

US 2009/0169142 A1 Jul. 2, 2009

(30) Foreign Application Priority Data

Dec. 31, 2007 (DE) ......................... 10 2007 063 257

(51) Int. Cl.
*F01M 9/10* (2006.01)
*F16C 35/00* (2006.01)

(52) U.S. Cl. ..................................... 123/90.38; 384/429

(58) Field of Classification Search .................. 384/429, 384/432–435; 123/90.38, 195 C
See application file for complete search history.

(56) References Cited

U.S. PATENT DOCUMENTS 4,709,670 A 12/1987 Ampferer
6,863,039 B2 * 3/2005 Salameh .................... 123/90.38
7,316,215 B1 1/2008 Nino et al.
2002/0112684 A1 * 8/2002 Jones et al. ................ 123/90.38
2008/0295796 A1 * 12/2008 Dunsch et al. ............ 123/195 C

FOREIGN PATENT DOCUMENTS

DE 3519205 12/1986
DE 102006054559 11/2006
DE 202005013879 1/2007
DE 102005048953 5/2007

OTHER PUBLICATIONS

English abstract provided for DE-102005048953.

* cited by examiner

*Primary Examiner* — James Pilkington
(74) *Attorney, Agent, or Firm* — Rader, Fishman & Grauer PLLC

(57) ABSTRACT

A bearing device for supporting a camshaft in a cylinder head is disclosed. The bearing device comprising at least one locking contour, which is connected with at least one counter-locking contour configured at a cylinder head cover, such that the cylinder head cover is clamped tightly against the cylinder head by the bearing device.

14 Claims, 2 Drawing Sheets a)

b)

INTERNAL COMBUSTION ENGINE WITH A CAMSHAFT BEARING DEVICE

CROSS-REFERENCES TO RELATED APPLICATION

This application claims priority to German patent application DE 10 2007 063 257.8 filed Dec. 31, 2007, which is hereby incorporated by reference in its entirety.

TECHNICAL FIELD

The present invention relates to a bearing device for supporting a camshaft in a cylinder head. The invention relates further to an internal combustion engine equipped with such a bearing device.

BACKGROUND

In today's internal combustion engines, a cylinder head cover covering the cylinder head is typically connected securely and tight with the cylinder head by means of a plurality of screws. The screwing of the cylinder head cover is carried out here in a separate assembly step which is associated with significant assembly cost. Moreover, for fixing of the cylinder head cover on the cylinder head, a plurality of fastening elements are required, for example the above mentioned screws, which cause an increased component variety and hence higher storage and logistic cost.

The present invention is concerned with the problem to fix a cylinder head cover in a particular simple and assembly-friendly manner on a cylinder head.

This problem is solved according to the advantageous embodiments disclosed throughout the specification. Advantageous embodiments are subject matter of the dependent sub-claims.

SUMMARY

The invention is based on the general idea to provide, on a bearing device for supporting a camshaft in a cylinder head, a locking contour which is formed such that it simply locks in place with a counter-locking contour formed at the cylinder head cover when placing a cylinder head cover onto the cylinder head, and thereby clamps the cylinder head cover reliably and tight against the cylinder head. By means of the interlocking of the cylinder head cover with the bearing device supporting the camshaft, the previously necessary fasteners, for example the screws, can be eliminated, whereby the component variety and also the associated storage and logistic cost can be reduced. Furthermore, the connection according to the invention of the cylinder head cover with the cylinder head has the big advantage that for assembly on the cylinder head it is only necessary to simply push the cylinder head cover onto the same or the bearing device, respectively. A separate insertion and subsequent tightening of the mounting screws hence is not required, whereby the assembly process is considerably simplified and thereby can be performed more cost effectively. A disassembly of the cylinder head cover, which typically is made of plastic, can be carried out, for example, by a pressure load on the same at predefined positions, whereby the interlocking between the cylinder head cover and the bearing device is released, and the cylinder head cover can easily be removed.

In an advantageous further development of the solution according to the invention, the bearing device comprises at least two bearing blocks which are connected to each other in an aligned position via a U-shaped connection element, whereby the U-shaped connection element is connected with or rests against, respectively, at least three sides of each bearing block. The connection element can be welded here to the individual bearing blocks, and, together with a camshaft, form a prefabricatable module. Such a U-shaped connection element, if it is formed from a sheet metal, can be easily manufactured in the form of a sheet metal moulding part, whereby the locking contours for fixing the cylinder head cover also can be easily shaped at the same time. A separate production step for manufacturing of the locking contours is hence not required.

Preferably, the at least one locking contour is formed as a locking nose and the at least one counter-locking contour formed at the cylinder head cover is formed as a rib engaging behind the locking nose. Such a rib stiffens at the same time the cylinder head cover, whereby the rib is preferably formed at a rim having a sealing area of the cylinder head cover. In addition, such a rib provides the advantage to better transfer the holding-down force applied by the bearing device-side locking contour into the cylinder head cover, and thereby to better seal the same against the cylinder head. It is also an advantage that a rib formed in such manner allows wider manufacturing tolerances with respect to the locking contour on the bearing device because the same does not have to interact with a counter-locking contour which is restricted to a certain region, but is able to compensate even for wider tolerances without problems.

In a further advantageous embodiment of the solution according to the invention, the at least one locking contour is arranged at an end region facing towards the cylinder head of the bearing block or the U-shaped connection element. This provides the big advantage that the holding-down force transferred via the locking contour into the cylinder head cover preferably can be transferred directly into the rim area of the cylinder head cover, whereby the seal typically arranged in this rim area for sealing the cylinder head against the cylinder head cover can be brought to a better contact with the cylinder head cover or the cylinder head, respectively, and thereby a particularly reliable sealing between the two components can be ensured.

Further important features and advantages of the invention are apparent from the sub-claims, the drawings, and the associated description of the figures by means of the drawings.

It is to be understood that the above mentioned features, and the following features still to be described, are not only usable in the respective mentioned combination but also in other combinations, or on its, own without departing from the scope of the present invention.

BRIEF DESCRIPTION OF THE DRAWINGS

Preferred exemplary embodiments of the invention are illustrated in the drawings and are explained in more detail in the following description, wherein identical reference numbers are related to identical, or similar, or functionally identical components.

In the figures

DETAILED DESCRIPTION

Figure 1:
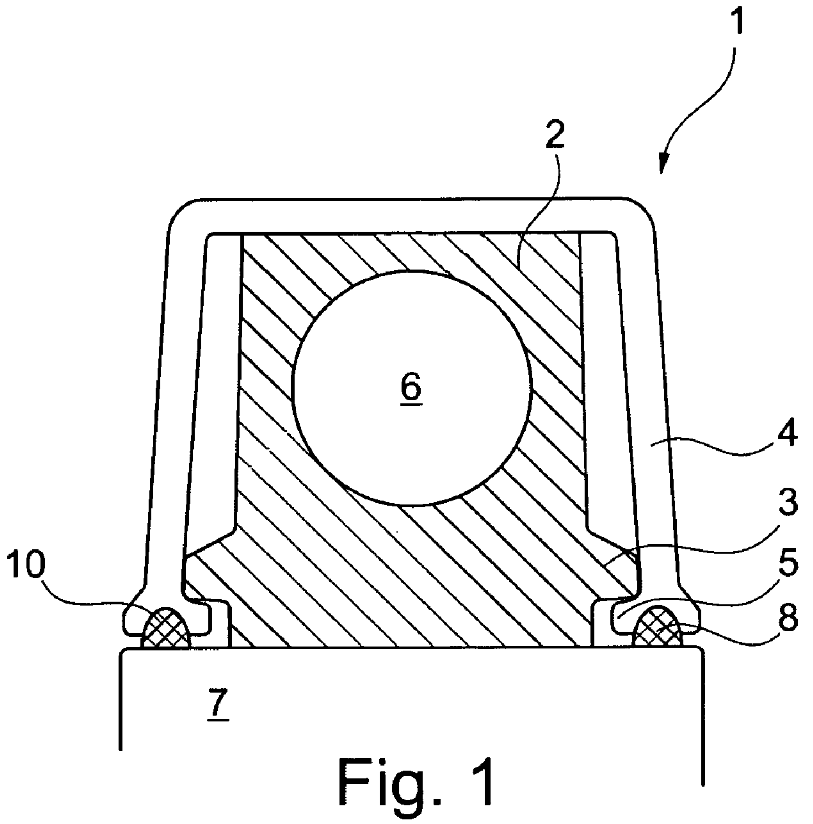
FIG. 1 shows schematically a sectional view through a bearing device according to the invention which is formed as bearing block for a camshaft to be supported, FIG. 2*a* and *b* show schematically a bearing device comprising a U-shaped connection element by means of which the cylinder head cover is clamped against the cylinder head.

According to FIG. 1, a bearing device 1 which is formed here in the type of a bearing block 2, comprises a locking contour 3 which interacts with a counter-locking contour 5 formed at a cylinder head cover 4. The bearing block 2 serves here for supporting a camshaft 6 at a cylinder head 7. The bearing device-side locking contour 3 is interlockable with the cylinder head cover-side counter-locking contour 5 in a manner that the cylinder head cover 4 can be clamped tightly against the cylinder head 7 via the bearing device 1, that is, in this case, via the bearing block 2. Separate mounting screws by means of which the cylinder head cover 4 is typically fixed at the cylinder head 7 can hence be eliminated, which, on the one hand, causes a reduction of the part variety and the associated storage and logistic cost, and, on the other hand, simplifies the assembly process of the cylinder head cover 4 on the cylinder head 7 considerably, since the cylinder head cover has only to be placed and pushed onto the cylinder head 7 until the cylinder head cover-side counter-locking contour 5 engages behind the locking contour 3 and thereby interlocks.

Between the cylinder head cover 4 and the cylinder head 7, a sealing element 8 is arranged, which, for example, can be formed as circumferential sealing ring, and seals a camshaft space 9 against an outer environment. For an easier positioning, the sealing element 8 can be placed into a cylinder head cover-side groove 10, as illustrated in FIG. 1, or into a cylinder head-side groove, so that in both cases the sealing element 8 is reliably fixed in its mounting position during pushing of the cylinder head cover 4 onto the cylinder head 7. Here, the cylinder head cover 4 is typically formed from plastic.

As is further apparent from FIG. 1, the camshaft 6 penetrates the bearing block 2 in a through-opening which is formed complementary to the outer circumference of the camshaft 6, wherein typically a plurality of bearing blocks 2 are provided with through-openings aligned to each other so that the camshaft 6 is supported by at least two bearing blocks 2.

Figure 2:
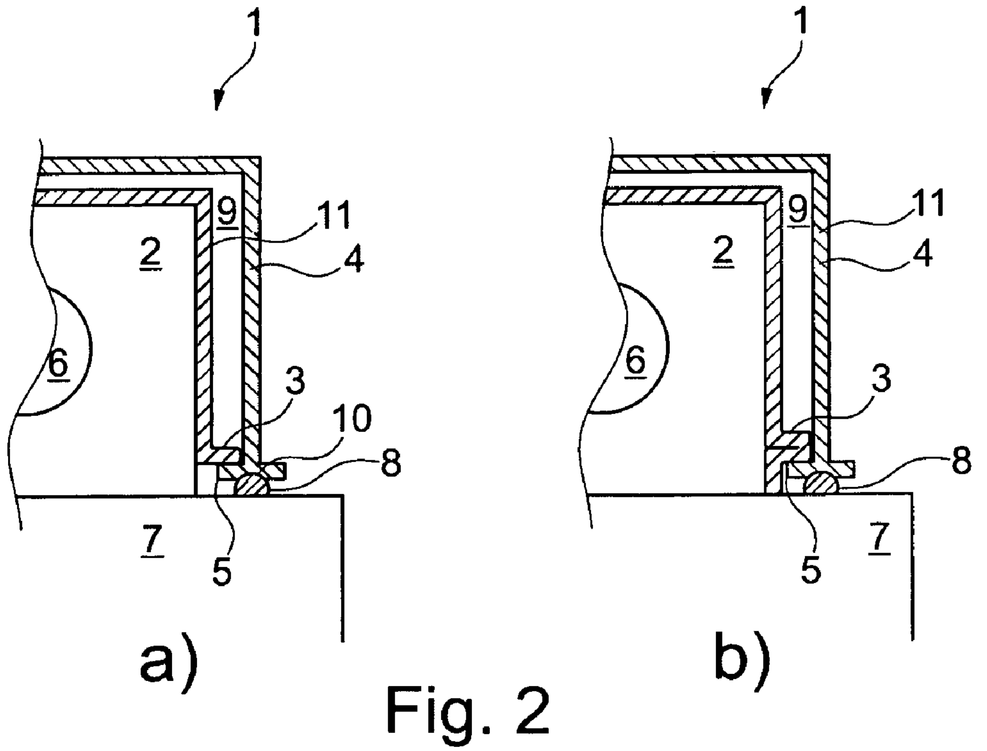
Figure 3:
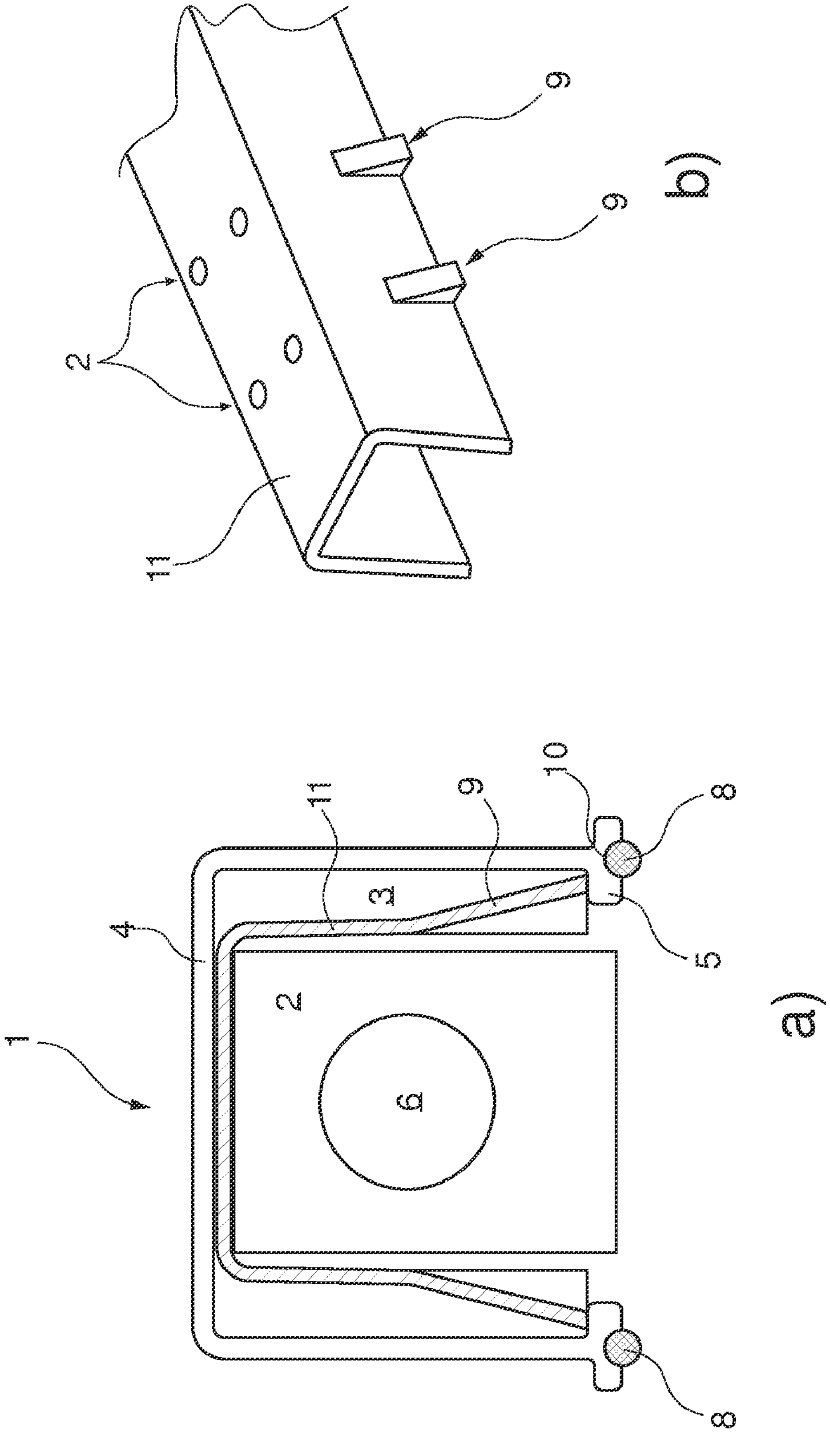
FIG. 3*a* shows schematically an illustration as in the FIGS. 2*a* and *b*, but for a different embodiment.
FIG. 3*b* shows schematically a U-shaped connection element comprising locking noses formed at the side.

According to FIGS. 2 and 3, the bearing device 1 comprises exactly these at least two bearing blocks 2 which are connected with each other by means of a U-shaped connection element 11 (cf. in particular FIG. 3*b*) in an aligned position, wherein the U-shaped connection element 11 preferably is connected with or rests against, respectively, at least three sides of each bearing block 2. It is in particular thinkable that the connection element 11 together with the associated bearing blocks 2 and the camshaft 6 forms a prefabricatable module which as a whole, and in particular in an aligned position, can be assembled at the cylinder head 7. For this, the connection element 11 is screwed or clipped, respectively, to the respective bearing block 2, and, additionally or alternatively, can be connected with the at least one bearing block 2 by means of a welded joint. Thinkable are in particular screw connections by means of which the connection element 11 can be fastened via the bearing block 2 at the cylinder head 7, wherein the bearing block 2 comprises through-openings through which the screws fixing the connection element 11 can be passed through and can be screwed into screw holes aligned and provided at the cylinder head 7.

By means of the bearing device 1 according to the invention, a holding-down force, which is applied to the cylinder head cover 4, is produced, which is so high that the cylinder head cover 4 can be clamped tight and reliable against the cylinder head 7. For this, the locking contour 3 can be formed in a completely different manner. According to FIG. 1, the locking contour 3 is formed as a locking nose, while the cylinder head cover-side counter-locking contour 5 is formed as a rib, engaging behind the locking nose. This provides the advantage that the rim region receiving the sealing element 8 of the cylinder head cover 4 can be stiffened by the rib, and, at the same time, is able to compensate manufacturing tolerances or assembly tolerances, respectively, between the locking contour 3 and the counter-locking contour 5, without problems, since an exact alignment of the locking contour 3 against the counter-locking contour 5 is not required.

As is further apparent from FIGS. 1 to 3, the at least one locking contour 3 is arranged at an end region facing towards the cylinder head 7 of the bearing block 2 or the U-shaped connection element 11 so that the locking contour 3 can act directly on a sealing area carrying the sealing element 8, and thereby can produce a particularly high sealing effect.

If the locking contour 3, as illustrated in FIG. 1, is formed as a locking nose, the same can be shaped during manufacturing of the bearing block 2 on the same, or can be machined in a subsequent machining step, respectively. If the locking contour 3 is arranged at the connection element 11, then it is thinkable that the locking contour 3 as well as the cylinder head cover-side counter-locking contour 5 is formed rib-like, thereby applying a holding-down force on the cylinder head cover 4 along the entire sealing area. According to FIG. 2, the locking contour 3 is formed as an edge-bent rib while the locking contour 3 according to FIG. 2*b* is produced by means of crimping. It is also thinkable that the locking contour 3, as shown in FIGS. 3*a* and 3*b*, is formed as a shaped locking nose, which, in particular in the case that the connection element 11 is manufactured as a sheet metal moulding part, can be formed in a single operation step during manufacturing of the connection element 11. The locking contours 3 illustrated according to FIGS. 2*a* and 2*b* can also be denoted as so-called beads which, as mentioned above, can be produced, for example, by crimping or edge bending.

By means of the bearing device 1 according to the invention, thus a particularly inexpensive and simple assembly of the cylinder head cover 4 at the cylinder head 7 can be achieved, wherein in addition, due to the mounting screws which are not necessary anymore, the part variety and hence the storage and logistic cost can be reduced. To unscrew the cylinder head cover 4 from the cylinder head 7, for example, a tool can be used which is inserted from outside into the groove 10 of the cylinder head cover 4, by means of which a bend-up movement can be applied to the cylinder head cover 4, thereby releasing the interlock between the locking contour 3 and the counter-locking contour 5. Thus, also unscrewing of the cylinder head cover 4 from the cylinder head 7 can be configured considerably simpler compared to conventional screwing solutions.

The invention claimed is:

1. An internal combustion engine, comprising:

a bearing device for supporting a camshaft in a cylinder head, wherein the bearing devices includes at least two bearing blocks, connected with each other in an aligned position by a U-shaped connection element, wherein the U-shaped connection element is one of connect with or rests against at least three sides of each bearing block, and wherein the bearing device includes at least one locking contour;

at least one cylinder head cover;

at least one counter-locking contour formed on the cylinder head cover where the cylinder head cover is clamped against the cylinder head by way of the bearing device; and wherein the at least one locking contour is connected with the at least one counter-locking contour.

2. The internal combustion engine according to claim 1, wherein the at least one locking contour is arranged at an end region facing towards the cylinder head of the U-shaped connection element.

3. The internal combustion engine according to claim 1, wherein the interaction between the at least one locking contour and the at least one counter-locking contour causes the camshaft to be supported at least one of supported and retained.

4. The internal combustion engine according to claim 1, wherein the at least one locking contour interacts with a rim comprising a sealing area of the cylinder head cover.

5. The internal combustion engine according to claim 4, wherein in the sealing area of the cylinder head cover, a sealing element is arranged which seals the cylinder head cover against the cylinder head.

6. The internal combustion engine according to claim 5, wherein the sealing element is a circumferential sealing ring.

7. The internal combustion engine according to claim 5, wherein the interaction between the at least one locking contour and the at least one counter-locking contour compresses the sealing element to create a fluid tight connection between the cylinder head cover against the cylinder head.

8. The internal combustion engine according to claim 1, wherein the at least one locking contour is formed as a locking nose, and the at least one counter-locking contour is a rib engaging behind the locking nose.

9. The internal combustion engine according to claim 8, wherein in a sealing area of the cylinder head cover a sealing element is arranged which seals the cylinder head cover against the cylinder head.

10. The internal combustion engine according to claim 9, wherein the sealing element is a circumferential sealing ring.

11. The internal combustion engine according to claim 1, wherein the at least one locking contour is one of a shaped or a crimped bead for the U-shaped connection element.

12. The internal combustion engine according to claim 1, wherein the U-shaped connection element is formed from a metal based material.

13. The internal combustion engine according to claim 12, wherein the metal based material is a sheet metal.

14. The internal combustion engine according to claim 12, wherein for the U-shaped connection element the at least one locking contour is one of a shaped or a crimped bead.

* * * * *